(12) United States Patent
Rouyer

(10) Patent No.: US 9,967,143 B2
(45) Date of Patent: May 8, 2018

(54) METHOD AND APPARATUS FOR NETWORK INTERCONNECTION

(71) Applicant: Alcatel-Lucent USA Inc., Murray Hill, NJ (US)

(72) Inventor: Jessy Victor Rouyer, Fort Worth, TX (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 63 days.

(21) Appl. No.: 14/973,085

(22) Filed: Dec. 17, 2015

(65) Prior Publication Data

US 2016/0182361 A1   Jun. 23, 2016

Related U.S. Application Data

(60) Provisional application No. 62/093,686, filed on Dec. 18, 2014.

(51) Int. Cl.
| | | |
|---|---|---|
| *H04L 12/707* | (2013.01) | |
| *H04L 12/24* | (2006.01) | |
| *H04L 12/26* | (2006.01) | |

(52) U.S. Cl.
CPC ...... *H04L 41/0816* (2013.01); *H04L 41/0672* (2013.01); *H04L 43/0811* (2013.01); *H04L 43/10* (2013.01)

(58) Field of Classification Search
None
See application file for complete search history.

(56) References Cited

U.S. PATENT DOCUMENTS

| | | | | |
|---|---|---|---|---|
| 6,981,174 B1* | 12/2005 | Hanning | ............. | G06F 11/2007 714/4.11 |
| 2004/0076160 A1* | 4/2004 | Phaltankar | .......... | H04L 12/5601 370/395.1 |
| 2004/0221042 A1* | 11/2004 | Meier | ................. | H04L 12/4625 709/227 |
| 2004/0264364 A1* | 12/2004 | Sato | .................. | H04L 12/40182 370/217 |
| 2006/0031482 A1* | 2/2006 | Mohan | ................ | H04L 12/4641 709/224 |
| 2010/0110881 A1* | 5/2010 | Ryoo | ...................... | H04L 12/42 370/225 |
| 2011/0013640 A1* | 1/2011 | Farkas | ................ | H04L 12/4645 370/395.53 |
| 2011/0164493 A1* | 7/2011 | Bragg | ................. | H04L 12/4625 370/217 |
| 2011/0292833 A1* | 12/2011 | Kapitany | ............... | H04L 12/437 370/254 |
| 2011/0299402 A1* | 12/2011 | Vobbilisetty | ........ | H04L 12/4641 370/241 |
| 2012/0147741 A1* | 6/2012 | Wei | ....................... | H04L 12/413 370/225 |

* cited by examiner

*Primary Examiner* — Eunsook Choi
(74) *Attorney, Agent, or Firm* — Stephen J. Wyse

(57) ABSTRACT

A method and apparatus for facilitating protection in a communication network or portion thereof. In a network such as an Ethernet SNC, an intermediate node is provided for connecting the East and West node to form a Working transport entity. The East and West node are also connected at different ports to each other to form a Protection transport entity. The intermediate node and the East node are configured to monitor and adapt to network conditions, effectively determining whether traffic between the West node and the East node uses the Working transport entity or the Protection transport entity.

12 Claims, 7 Drawing Sheets

METHOD AND APPARATUS FOR NETWORK INTERCONNECTION

CROSS-REFERENCE TO RELATED APPLICATIONS

This non-provisional application claims the benefit of priority under 35 U.S.C. § 119(e) to U.S. Provisional Application No. 62/093,686, filed on 18 Dec. 2014, the entire contents of which is incorporated herein by reference.

BACKGROUND

Field of the Disclosure

The present disclosure relates generally to network communication and, more particularly, to network interconnection and protection used, for example, in a Dual Node Interconnect (DNI) leveraging ITU-T G.8031 and similar or related protocols.

Description of the Related Art

The following abbreviations are herewith expanded, at least some of which are referred to within the following description of the state-of-the-art and the present invention APS Automatic Protection Switching
CCM Continuity Check Message
DNI Dual Node Interconnect
DRNI Distributed Resilient Network Interconnect
IEEE Institute of Electrical and Electronics Engineers
ITU International Telecommunication Union
LoC Loss of Continuity
MAC Media Access Control
MEG Maintenance Entity Group
MEP Maintenance End Point
OAM Operation, Administration and Maintenance
PDU Protocol Data Unit
SF Signal Fail
SF-P Signal Fail on Protection
SNC SubNetwork Connection
VID VLAN Identifier
VLAN Virtual Local Area Network Modern communications often involve many interconnected nodes, or special purpose computing devices that receive and forward data traffic and control messages encoded in electronic form. The nodes may be connected together with other devices by, for example, fiber optic or copper cables. Each node may have a number of ports to which the cables or other transmission means are connected, so one node may be connected to many others.

Communication networks may carry data representing, for example, email, voice calls, or streaming video. A transmission traveling from source to destination may pass through many network nodes. Nodes may be, for example, bridges, switches, or routers. Networks may interconnect with other networks, hence the term "internet", and a transmission may pass through a number of such networks.

In many instances, a dedicated circuit through the network or networks is not established for a single call or other communication between source and destination. Instead, data is divided into units sometimes called packets or frames, which are individually addressed so that non-destination nodes receiving a frame may identify a port on which to forward the frame. At their destination, the transmission units are reassembled to replicate the originally transmitted data. The process of addressing and transporting data is largely standardized, for example in protocols promulgated by the ITU or IEEE so that nodes made by a variety of manufacturers may operate in the same network. One widely-used scheme that is described in a number of protocol documents is known as Ethernet.

As network nodes and the cables or other means connecting them are subject to failure (including inadvertent disconnection), protection schemes have been worked out so that data can be re-routed to permit communications to continue while automatically circumventing the failed device or path. A description of one such scheme is set forth in a document referred to as ITU-T G.8031 (Ethernet linear protection switching).

Standard protocol documents, though comprehensive, often do not describe every situation or environment. In the case of G.8031, for example, it would be advantageous to find solutions to efficiently support protection in a DNI configuration at the interconnection of two networks.

SUMMARY

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later. In some embodiments, an apparatus for facilitating network protection is provided. In these embodiments, the apparatus includes an intermediate node having a first port for connecting the intermediate node with a West node of a network, a second port for connecting the intermediate node with an East node of the network, and a third port for connecting the intermediate node to another network and for configuring an Up MEP for the network; wherein the intermediate node is configured to adapt to network conditions based at least in part on the status of connectivity through the intermediate node's third port and the status of respective connections to the intermediate node first and second ports.

In some embodiments, a method for facilitating network protection is provided. In these embodiments, the method includes providing an intermediate node having a first port for connecting with the West node, a second port for connecting with the East node, and a third port for connecting to another network than the network in which the intermediate, East and West nodes participate; the intermediate node including an Ethernet connection function (ETH_C) hosting no SNC (subnetwork connection) protection switching process and for which learning is disabled, providing an ETH_C-facing Up MEP associated with the third port, configuring the Up MEP to detect an LoC between the first port of the intermediate node and a first port of the West node, and to detect an LoC between the second port of the intermediate node and a first port of the East node, and configuring the intermediate node to adapt the intermediate node to SNC conditions based at least in part on the status of connectivity through the intermediate node's third port and the status of respective connections to the intermediate node first and second ports.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Disclosed is a manner of protecting a communication network or a defined portion of a communication network. Described here is a protection scheme implemented in a network such as an SNC, which may be used as part of a DNI (dual node interconnection) between two networks.

Figure 1:
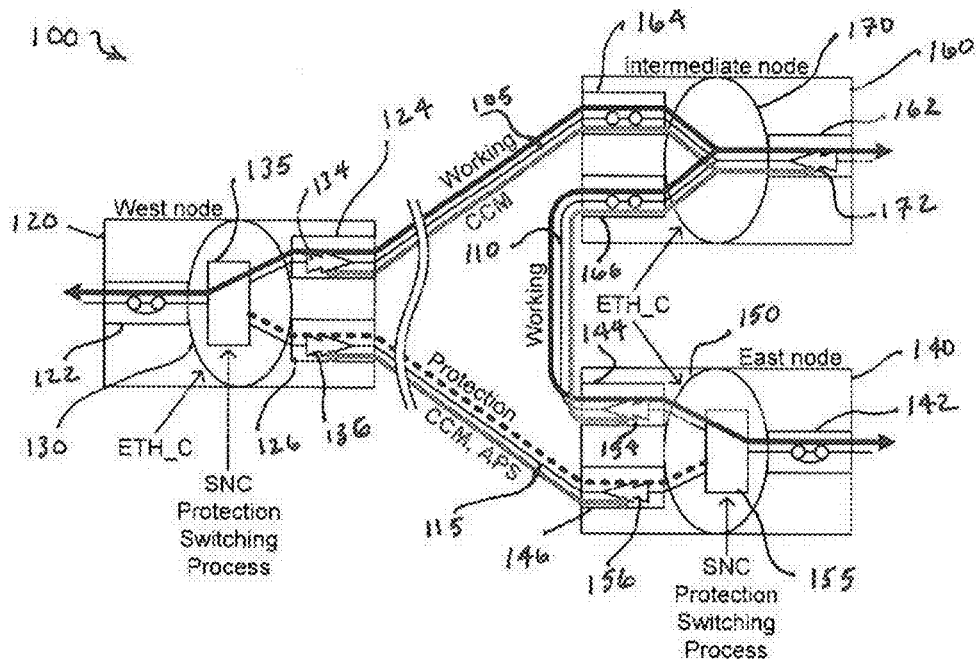
FIG. 1 is a block diagram illustrating selected components of a communication network according to some embodiments.

FIG. 1 is a block diagram illustrating selected components of a communication network 100 according to some embodiments. The communication network 100 includes a first node 120, referred to herein as the West node. West node is a SNC end point of network 100 and includes three ports 122, 124, and 126. A second node 140, referred to herein as the East node, is a second SNC end point of network 100. East node 140 includes three ports 142, 144, and 146.

In this embodiment, port 122 of West node 120 is or may be placed in communication with a first external network which may at times herein be referred herein to as network A (not shown). Similarly port 142 of East node 140 is or may be placed in communication with a second external network which may at times herein be referred herein to as network B (not shown). Ports 124 and 126 of West node 120 are connected directly or indirectly to ports 144 and 146, respectively, of East node 140. In this way, network 100 may form a connection or part of a connection between networks A and network B. As alluded to above, in a common implementation environment network 100 may, for example, form a DNI (dual node interconnection) between the two networks.

In the embodiment of FIG. 1, network 100 also includes a third node 160, referred to herein as an intermediate node. Intermediate node 160 includes three ports 162, 164, and 166. Port 162 of intermediate node 160 is or may also be placed in communication with network B (not shown). Port 164 of intermediate node 160 is connected to port 124 of West node 120, and port 166 of intermediate node 160 is connected to port 144 of East node 140.

Usually each of these nodes have a processor or multiple processors (not shown) for carrying out the function of the node that are stored in a memory device (also not shown) as executable program instructions. Other node functions may be carried out by hardware components.

As implied in FIG. 1, intermediate node 160 in this embodiment is in relatively close physical proximity to East node 140, as may be preferable in many implementations. West node 120 is located relatively further away from intermediate node 160 and East node 140. This, of course, may vary by implementation, but note that in this embodiment intermediate node 160 and East node 140 are both in or may be placed into communication with network B.

In the embodiment of FIG. 1, port 124 of West node 120 and port 164 of intermediate node 160 are in communication via connector 105, which may be but is not necessarily a fiber optic cable. Similarly, port 126 of West node 120 and port 146 of East node 140 are in communication via connector 115. Finally, port 166 of intermediate node 160 is in communication with port 144 of East node 140 via connector 110. Note that the connectors 105, 110, and 115 may also be communication paths that include other intermediary devices (not shown), but any such devices are of necessity presumed to not materially alter the scheme being described herein. For convenience, the connections may then in this case be characterized herein as direct connections.

In this embodiment, each of the nodes illustrated in FIG. 1 are Ethernet switching nodes, and are shown as having a respective Ethernet connection function (ETH_C) 130, 150, 170. In this illustrated configuration, West node 120 and East node 140 are presumed to be end points according to the ITU-T G.8031 protocol; each includes a respective SNC (sub network connection) protection switching process 135, 155. Intermediate node 160 hosts no SNC protection switching process and learning is disabled. This allows VID traffic ingressing at any of the ports 162, 164, or 166 to egress at any of the other two ports if not otherwise filtered. In FIG. 1, note that symbol including two small circles connected by an arc indicates an Ethernet flow point.

In the illustrated configuration of FIG. 1, a Working transport entity is defined along connector 105 and connector 110. A Protection transport entity is defined along connector 115. Data traffic for a given VID will transit between network A and network B via the Working transport entity under normal network conditions. To monitor these conditions, MEPs (maintenance end points) are established. In this embodiment, West node 120 includes MEP 134 associated with port 124 and MEP 136 associated with port 126. East node 140 includes MEP 154 associated with port 144 and MEP 156 associated with port 146. In terms of the G.8031 protocol MEPs 134, 136, 154, and 156 are configured Down MEPs, while MEP 172 associated with port 162 of intermediate node 160 is configured an Up MEP.

In the embodiment of FIG. 1, the Up MEP 172 is configured so that it does not generate CCMs (continuity check messages); for example by setting MI_CC_Enable to false. The MEG ID (maintenance entity group ID) and MEG level, for example MI_MEG_ID and MI_MEL, respectively, of Up MEP 172 are configured to be the same as those of the Down MEPs which it connects on the East and West nodes (in FIG. 1 MEP 134 and MEP 154). A list of peer MEPs associated with this Up MEP 172 is provisioned with the MEP IDs of these two Down MEPs 134 and 154. Note that "MI_" variables are described in ITU_T G.8021.

In this embodiment, the Down MEPs of the West node 120 and the East node 140 source and sink CCM and APS (automatic protection switching) PDUs (protocol data units) on the Protection transport entity and CCM PDUs on the Working transport entity. CCM PDUs are sinked at the Up MEP 172. In this fashion, Up MEP 172 is able to detect any LoC (loss of continuity) to the Down MEPs (to which it connects).

In the embodiment of FIG. 1, the intermediate node is configured to adjust VID filters on at least its port 162. In a preferred embodiment, a variable is established and filtering decisions are based on the value of this variable. For convenience, this variable will be referred to as "Connected". Connected is a binary variable in the sense that it may have a value of TRUE or FALSE. Using in part, for example, the MEP configuration described above, the intermediate node 160 determines whether the relaying of VID traffic on port 162 is possible (TRUE) or not (FALSE). It also determines the status of continuity from the Up MEP 172 and the respective Down MEPs 134 and 154. Values may be assigned to these continuity conditions as well: a TRUE value if an LoC is not detected between the Up MEP 172 and the Down MEP 134 on the West node 120, and a TRUE value if an LoC is detected between the Up MEP 172 and the Down MEP 154 on the East node 140 (otherwise FALSE for both LoC conditions).

In this embodiment, the intermediate node 160 is configured to set the value of Connected (for the intermediate node) by first performing a Boolean calculation involving a logical AND between the LoC condition values, as determined above, and then performing a logical AND between the result and the value set for the possibility of VID traffic relaying on the port 162 (also described above). The intermediate node 160 is further configured to filter traffic across port 172 if the value of Connected is FALSE as a result of this calculation. If the Connected value is TRUE, traffic ingressing the intermediate node 160 is relayed on port 162.

In the embodiment of FIG. 1, the East node 140 is configured to determine if signal fail has occurred on either the Working transport entity (SF) or the Protection transport entity (SF-P), as detected by the Down MEP 154 facing the intermediate node 160, and the Down MEP 156 facing the West node 120, respectively. A detected signal fail value may be assigned by a logical NAND operation between the values for SF and SF-P. In this embodiment, the East node 140 is also configured to set the value of Connected (for the East node) by first performing a Boolean calculation involving a logical AND between this detected signal fail value and the value for port 142 VID relaying possibility, as described above but applied to port 142 of East node 140.

In the embodiment of FIG. 1, East node is configured to facilitate relaying VID traffic via the intermediate node 160 (instead of the East node 140) when the value of Connected (for the East node) has a FALSE value. This may be effected, for example, by disabling CCM transmissions from the East node Down MEPs 154 and 156 while Connected on the East node has a FALSE value. In an alternate embodiment, an appropriate command such as a Lockout of protection command may be issued.

Note that in some embodiments network 100 may accommodate connection to a DRNI (Distributed Resilient Network Interconnect). (DRNI is intended, inter alia, to enhance link aggregation between two separately administered networks and is described, for example, in the protocol IEEE 802.1AX). In a DRNI implementation, the East node and the intermediate node could each be included in separate Portal Systems for interfacing of these Portal Systems as a Portal to a DRNI. The connections from port 142 of the East node 140 and port 162 of intermediate node 160 could connect to a DRNI. These two nodes could then support Gateway access to or from the DRNI, and the Connected variable described above may be used to indicate whether VID traffic is enabled to pass through one of the two local Gateways (as specified, for example, in IEEE 802.1AX. In this case, DRNI could be provisioned to preferably relay VID traffic via the East node Gateway (and via the intermediate node Gateway should the East node Gateway become inoperable).

Figure 2:
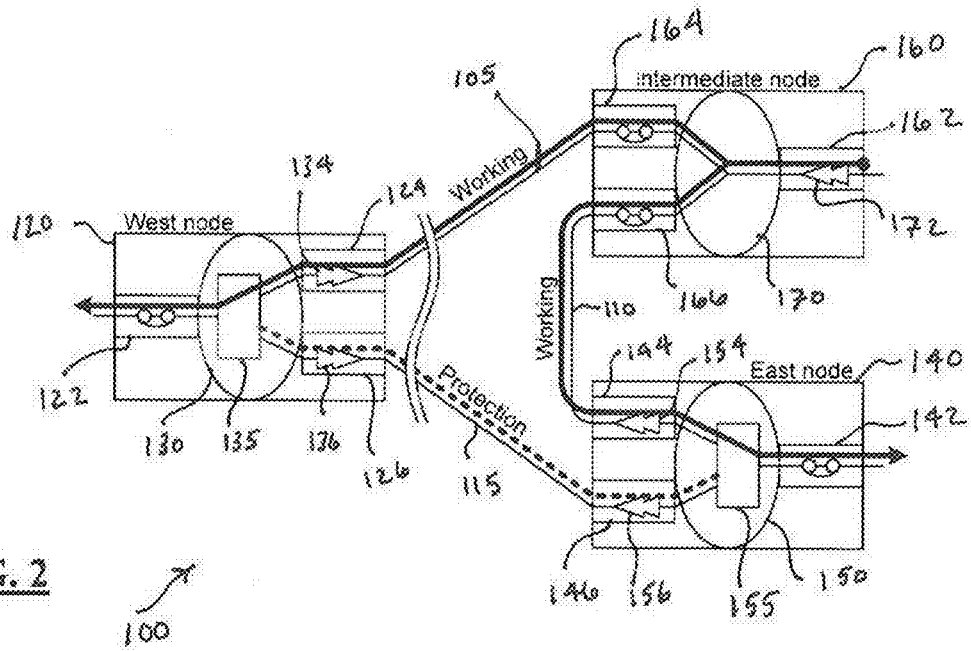
FIG. 2 is a block diagram illustrating operation of the selected components of communication network according to some embodiments.

FIG. 2 is a block diagram illustrating operation of the selected components of communication network 100 according to some embodiments. Error! Reference source not found. illustrates what may be referred to as the steady state. In this state, Connected is FALSE on the intermediate node and TRUE on the East node. VID traffic is filtered on the port 162 of intermediate node 160. VID frames are bridged to and selected from the Working transport entity.

Figure 3:
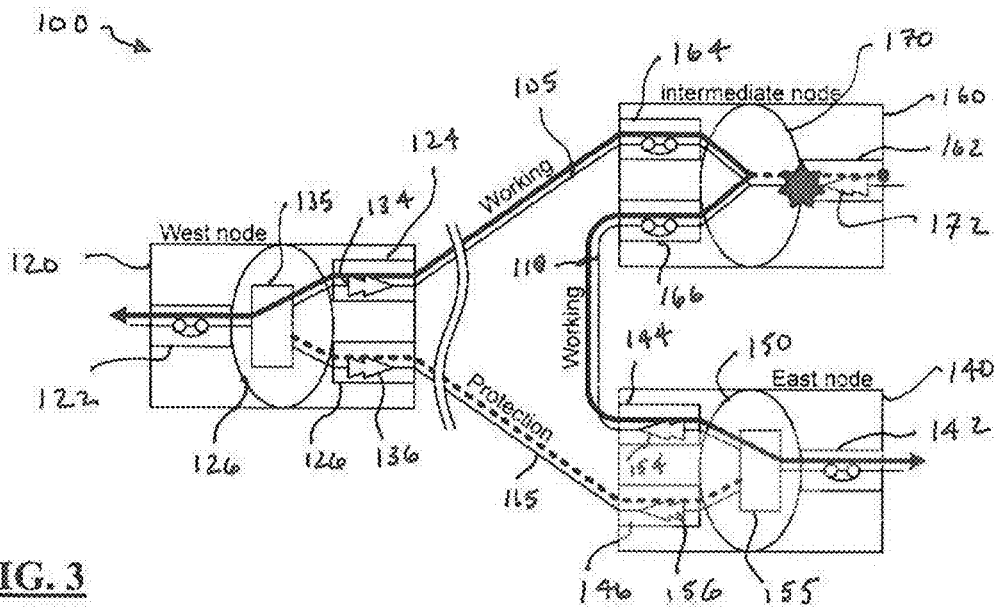
FIG. 3 a block diagram illustrating operation of the selected components of communication network according to some embodiments.

FIG. 3 is a block diagram illustrating operation of the selected components of communication network 100 according to some embodiments. Error! Reference source not found. illustrates an internal failure of the intermediate node 160 isolating its port 162. In this case, Connected is FALSE on the intermediate node 160 and TRUE on the East node 140. VID frames continue to be bridged to and selected from the Working transport entity.

Figure 4:
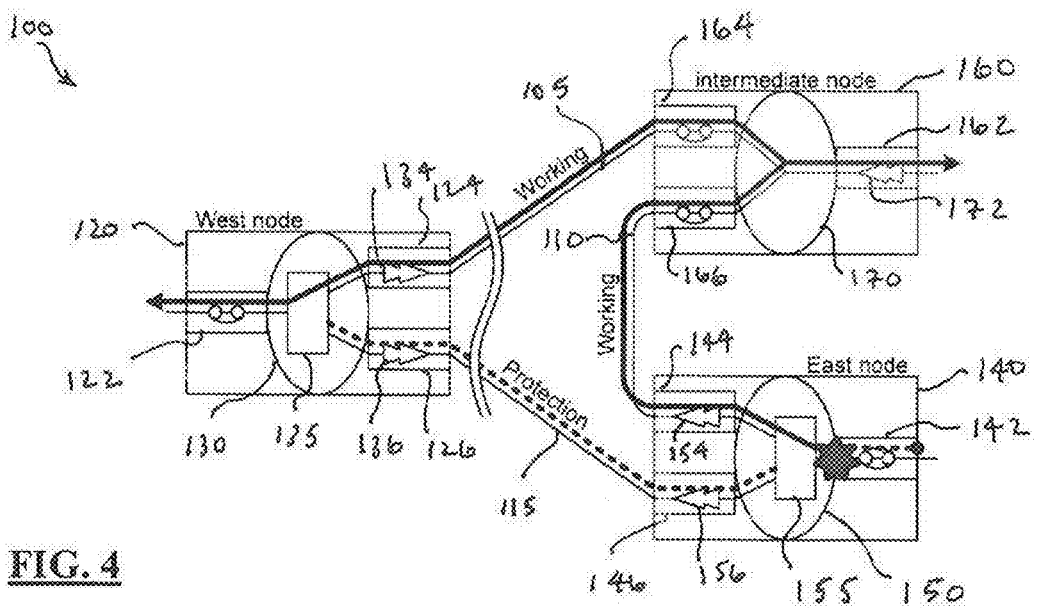
FIG. 4 a block diagram illustrating operation of the selected components of communication network according to some embodiments.

FIG. 4 is a block diagram illustrating operation of the selected components of communication network 100 according to some embodiments. FIG. 4 illustrates an internal failure of the East node isolating its port 142. In this case, Connected is TRUE on the intermediate node 160 (as a result of the MEP 154 of the East node 140 ceasing to transmit CCMs on the Working transport entity) and FALSE on the East node 140. VID frames continue to be bridged to and selected from the Working transport entity since SF-P (as a result of the MEP 156 of East node 140 ceasing to transmit CCMs on the Protection transport entity) has a higher priority than SF (as described, for example, in ITU-T G.8031).

In the scenario illustrated in FIG. 4, the reason for the East node 140 ceasing to transmit CCMs on both transport entities is that not doing so would result in the West node 120 bridging to, and selecting from, the East node 140 should a failure occur on the Working transport entity between the intermediate node 160 and East node 140, thereby preventing VID traffic from being forwarded onto the unfailed part of the Working transport entity via intermediate node 160.

Figure 5:
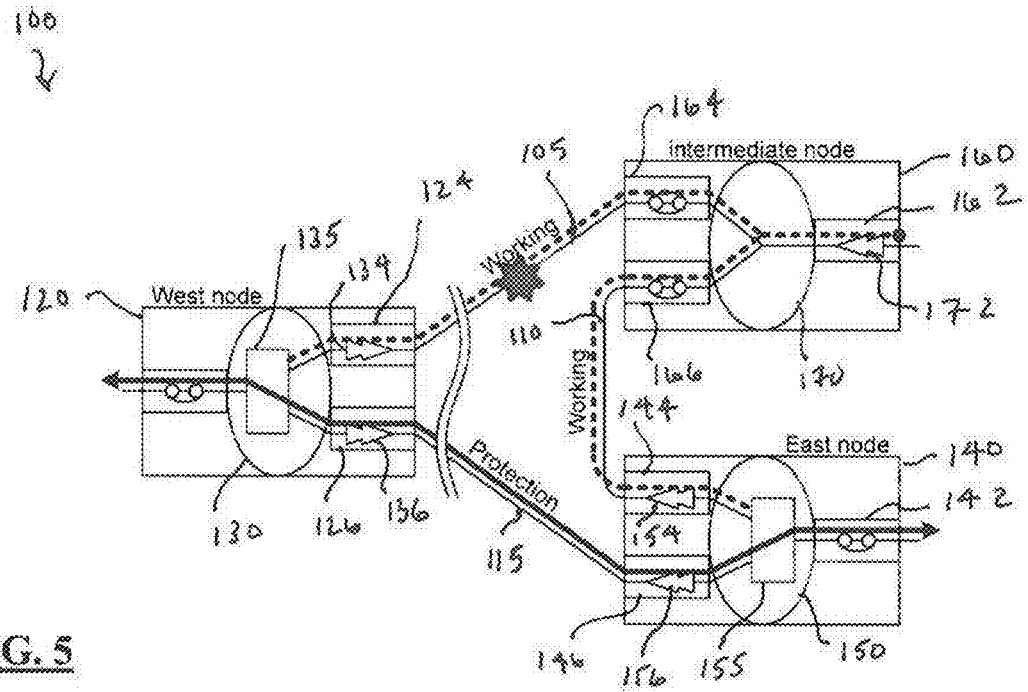
FIG. 5 a block diagram illustrating operation of the selected components of communication network according to some embodiments.

FIG. 5 is a block diagram illustrating operation of the selected components of communication network 100 according to some embodiments. In this embodiment, it is presumed that the relaying of VID traffic is possible on both port 142 of East node 140 and port 162 of intermediate node 160. FIG. 5 illustrates the failure of the Working transport entity between West node 120 and intermediate node 160. In this case, Connected is FALSE on the intermediate node 160 and TRUE on the East node 140. VID frames are bridged to and selected from the Protection transport entity as a result of SF.

Figure 6:
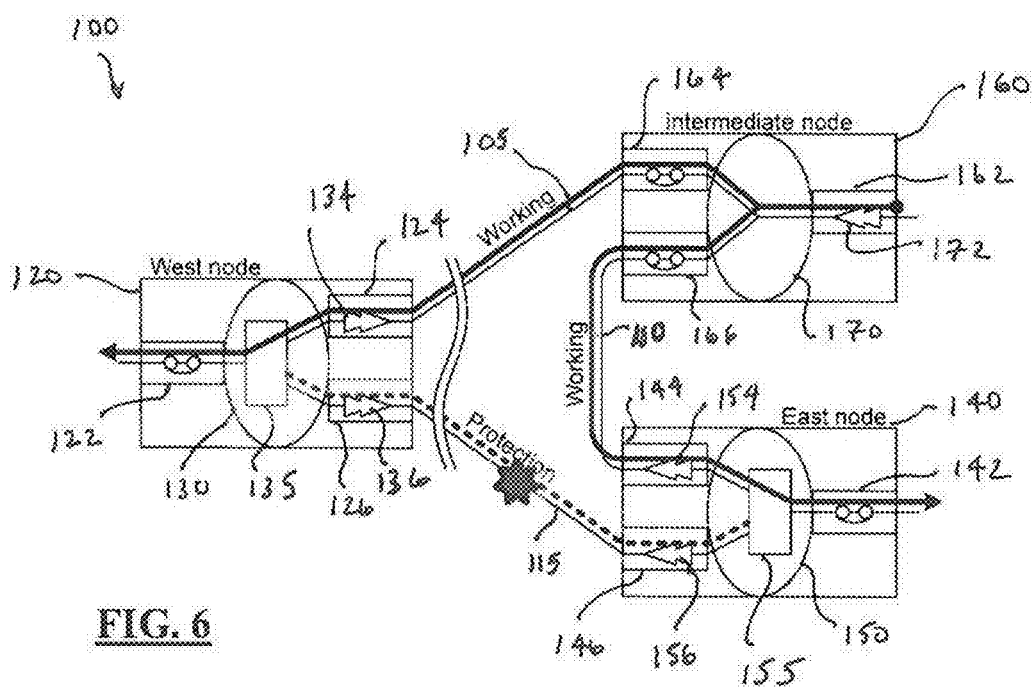
FIG. 6 a block diagram illustrating operation of the selected components of communication network according to some embodiments.

FIG. 6 is a block diagram illustrating operation of the selected components of communication network 100 according to some embodiments. In this embodiment, it is again presumed that the relaying of VID traffic is possible on both port 142 of East node 140 and port 162 of intermediate node 160. FIG. 6 illustrates the failure of the Protection transport entity between West node 120 and East node 140. In this case, Connected is FALSE on the intermediate node 160 and TRUE on the East node 140. VID frames are bridged to and selected from the Working transport entity as a result of SF-P without leaking at port 162 of the intermediate node 160.

Figure 7:
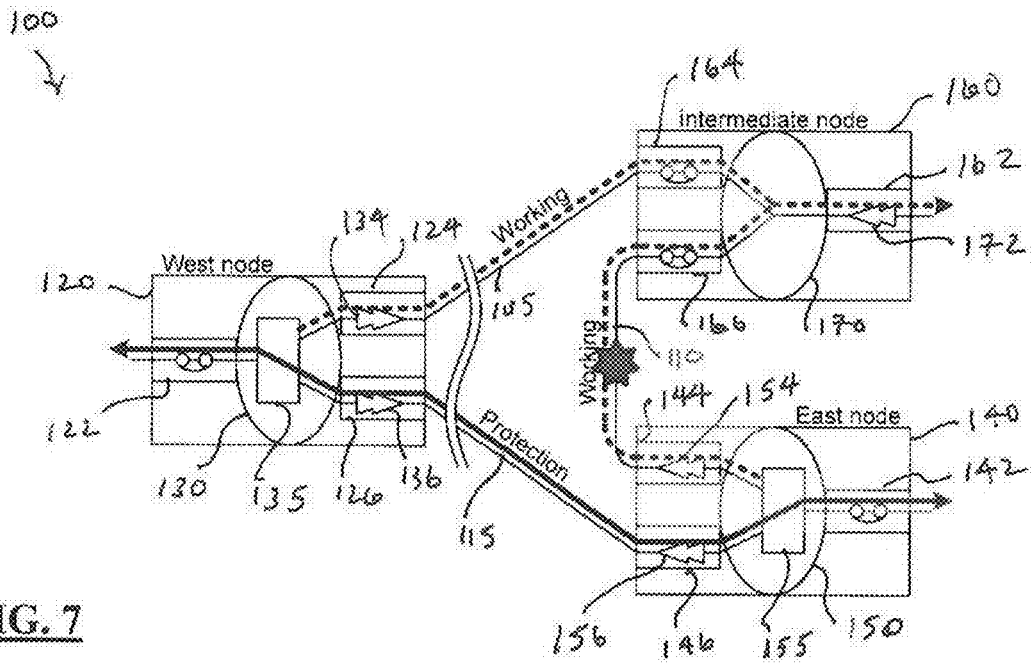
FIG. 7 a block diagram illustrating operation of the selected components of communication network according to some embodiments.

FIG. 7 is a block diagram illustrating operation of the selected components of communication network 100 according to some embodiments. In this embodiment, it is again presumed that the relaying of VID traffic is possible on both port 142 of East node 140 and port 162 of intermediate node 160. FIG. 7 illustrates the failure of the Working transport entity between intermediate node 160 and East node 140 (connector 110). In this case, Connected is TRUE on both the intermediate node 160 and East node 140. VID frames are bridged to and selected from the Protection transport entity as a result of SF. Even though Connected is TRUE on the intermediate node 160 and therefore VID filtering does not occur at its port 162, CCMs from the Down MEP 124 on the West node 140 are terminated at the Up MEP 172 thereby not leaking via this port. As the Working transport entity is neither bridged to, nor selected from, there is no ongoing traffic leaking via this port either.

Here it is noted that should the West node 120 bridge VID traffic on both transport entities, filtering VID traffic on the West node 120 port 124 attached to the Working transport entity upon detection by the West node 120 of SF in the absence of SF-P would prevent VID traffic from being forwarded on the Working transport entity thereby avoiding it from leaking via the port 162 of the intermediate node. Note that using DRNI (described above) in this case would make this additional VID filtering unneeded. In any other case, Connected would not be concurrently TRUE on both intermediate node 160 and East node 140, thereby making the need for such VID filtering on the West node 120 moot.

Figure 8:
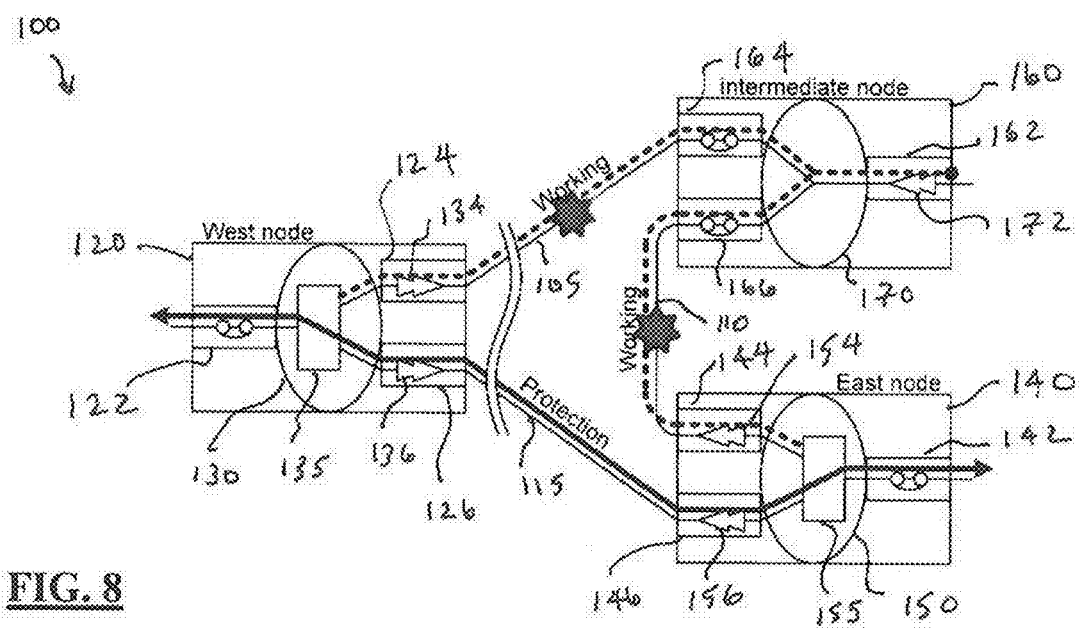
FIG. 8 a block diagram illustrating operation of the selected components of communication network according to some embodiments.

FIG. 8 is a block diagram illustrating operation of the selected components of communication network 100 according to some embodiments. In this embodiment, it is again presumed that the relaying of VID traffic is possible on both port 142 of East node 140 and port 162 of intermediate node 160. FIG. 8 illustrates the failure of the Working transport entity between West node 120 and intermediate node 160 on one hand, and intermediate node 160 and East node 140 on the other hand (failure of the intermediate node as a whole would have the same outcome). In this case, Connected is FALSE on the intermediate node 160 and TRUE on the East node 140. VID frames are bridged to and selected from the Protection transport entity as a result of SF.

Figure 9:
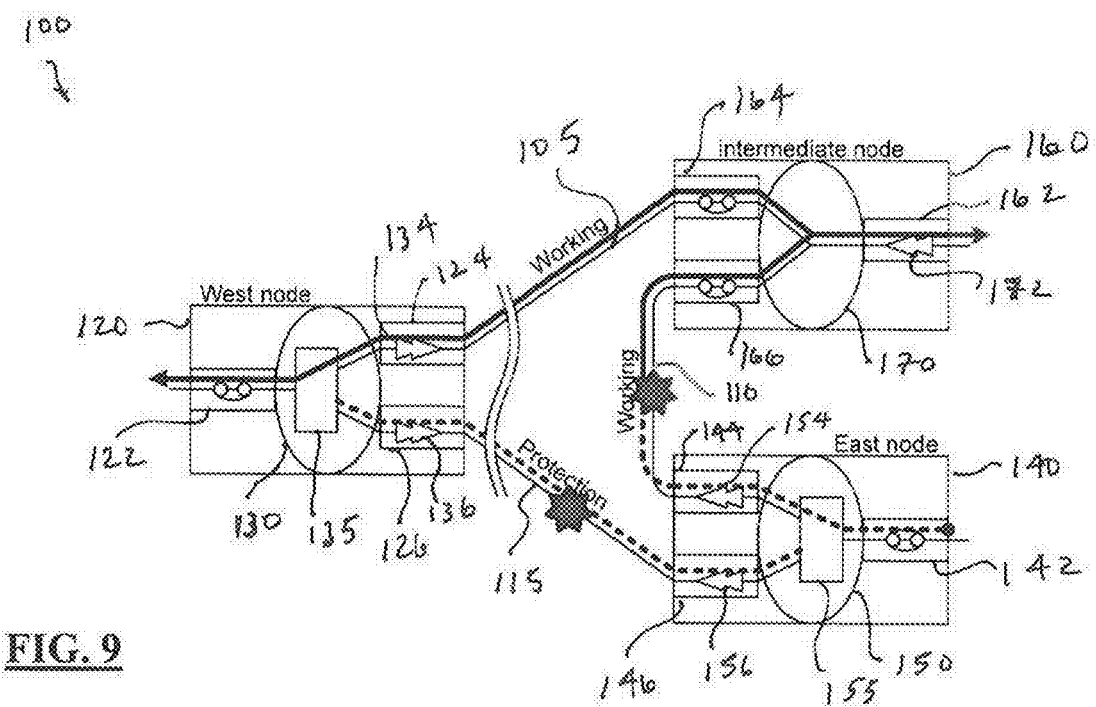
FIG. 9 a block diagram illustrating operation of the selected components of communication network according to some embodiments.

FIG. 9 is a block diagram illustrating operation of the selected components of communication network 100 according to some embodiments. In this embodiment, it is again presumed that the relaying of VID traffic is possible on both port 142 of East node 140 and port 162 of intermediate node 160. FIG. 9 illustrates the failure of the Working transport entity between intermediate node 160 and East node 140 on one hand, and the failure of the Protection transport entity between West node 120 and East node 140 on the other hand (failure of the East node as a whole would have the same outcome). In this case, Connected is TRUE on the intermediate node 160 and FALSE on the East node 140. VID frames are bridged to and selected from the Working transport entity since SF-P has a higher priority than SF. Even though the East node 140 is isolated from both West node 120 and intermediate node 160, VID traffic is relayed on the Working transport entity across the intermediate node 160 that does not perform VID filtering at its port 162. CCMs from the Down MEP 136 on the West node are terminated at the Up MEP 172 thereby not leaking via this port.

In an embodiment using DRNI, the DRNI could be provisioned to relay VID traffic via the intermediate node Gateway when Connected is FALSE on the East node thereby ensuring continuity between the network and the DRNI.

Figure 10:
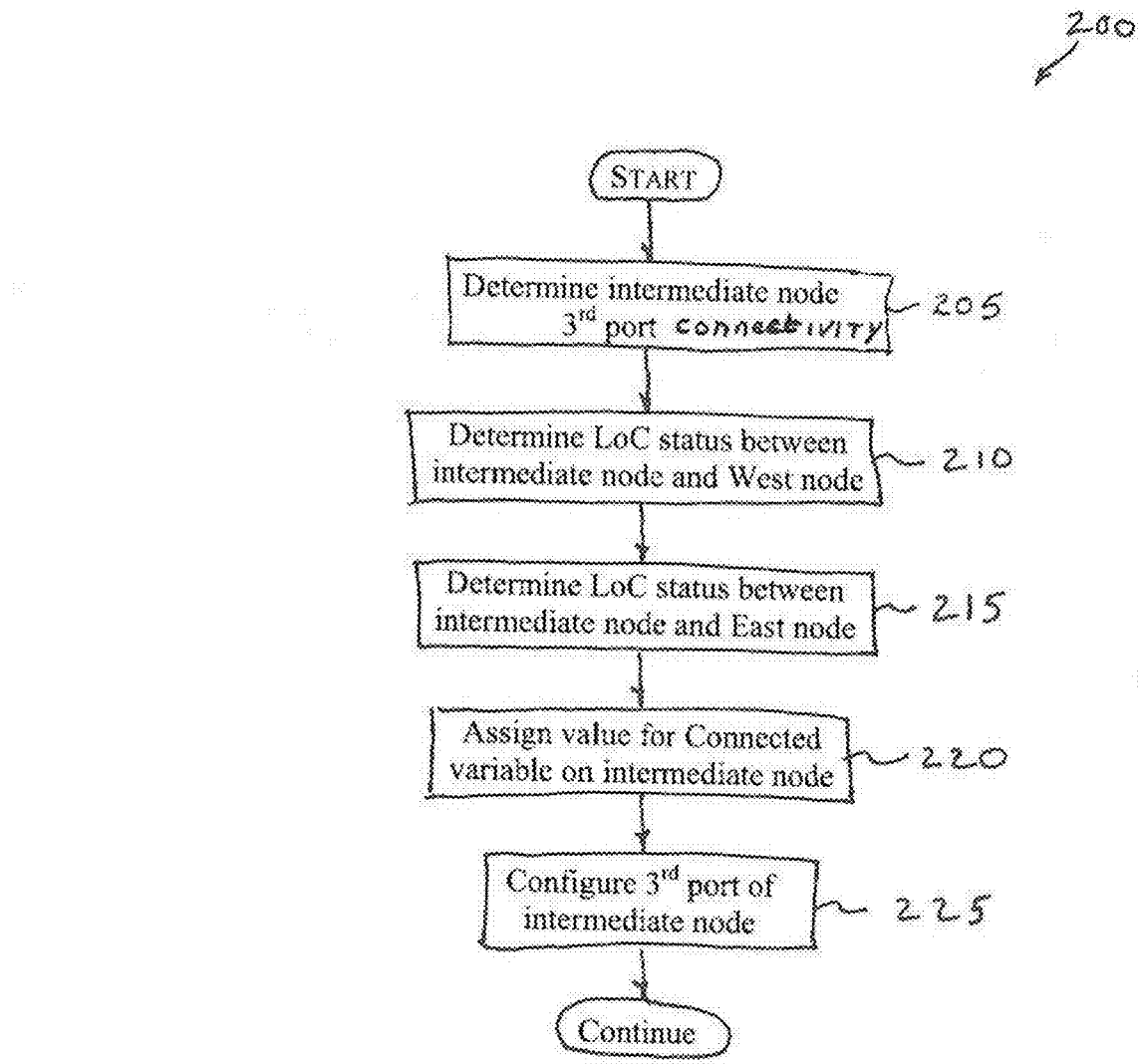
FIG. 10 is a flow diagram illustrating a method of operating network-protection apparatus.

FIG. 10 is a flow diagram illustrating a method 200 of operating network-protection apparatus. The method may be used to facilitate protection, for example, for a portion of a communication network such a DNI. At START it is presumed that the necessarily components are present and operational according to at least this embodiment (see, for example, FIG. 1 and the accompanying text). The process then begins with determining (step 205) connectivity through the third port of the intermediate node.

In this embodiment, the intermediate node also determines whether there has been a LoC between the intermediate node and a West node of the network (step 210), and whether there has been a LoC between the intermediate node and an East node of the network (step 215). In this embodiment, these determination steps 205, 210, 215 include storing or preserving the determined values for intermediate-node calculations. They also include updating the determinations, either from time to time or continually (not separately shown) depending on the implementation, and may be updated in any order and without respect to whether the other values are being updated at that time. In a preferred embodiment, each of the values are updated at least whenever an indication that the value has changed has been received (also not shown).

In the Embodiment of FIG. 10, a variable, which is herein referred to as Connected, is then assigned a value for the intermediate node (step 220) based at least in part on the status of connectivity through the intermediate-node third port and the status of continuity between the intermediate node and the two down nodes as determined in steps 205, 210, 215. The third port of the intermediate node is then configured (step 225) to either filter or relay traffic based at least in part on the value of Connected for the intermediate node. Note that while not a requirement unless recited in a claim or implied from the context, it is preferable that the value of Connected is changed and the configuration of connectivity through the third port adapted as soon as a change in network status is indicated.

The method 200 then continues as the intermediate node continues to monitor conditions within the network and adapt accordingly.

Figure 11:
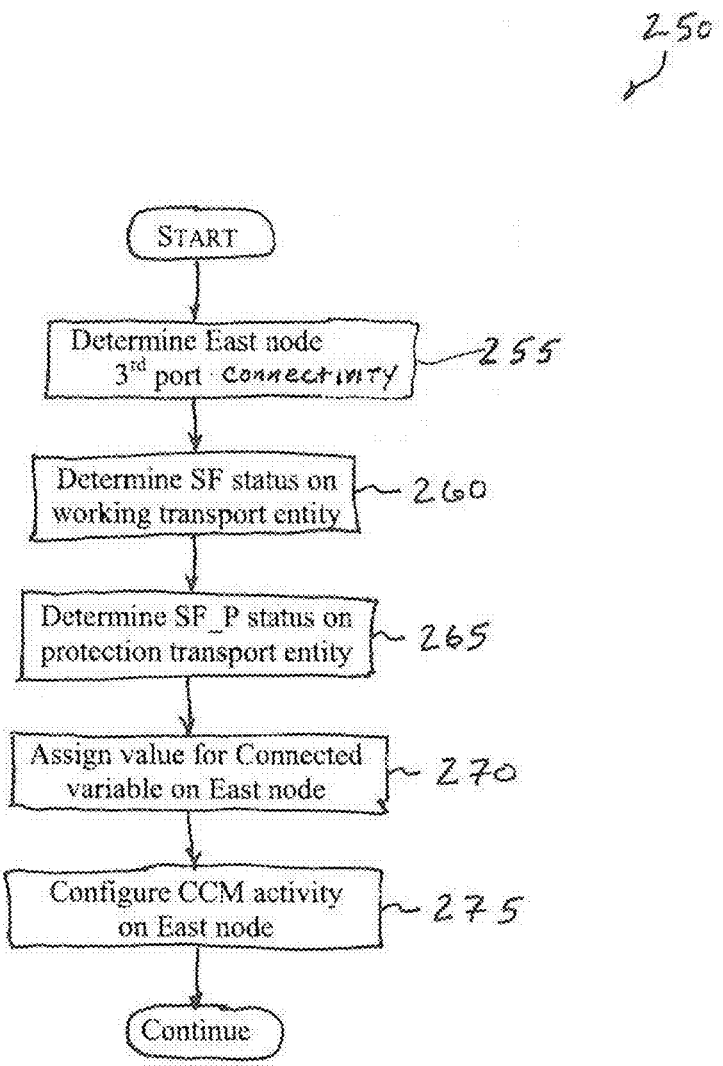
FIG. 11 is a flow diagram illustrating a method of operating network-protection apparatus

FIG. 11 is a flow diagram illustrating a method 250 of operating network-protection apparatus. The method may be used to facilitate protection, for example, for a portion of a communication network such as a DNI. At START it is presumed that the necessarily components are present and operational according to at least this embodiment (see, for example, FIG. 1 and the accompanying text). The process then begins with determining (step 255) connectivity through the third port of the East node.

In this embodiment, the East node also determines (step 260) whether SF has been detected on the Working transport entity established between a West node and the East node via an intermediate node. A determination (step 265) is also made as to whether SF-P has been detected on a Protection transport entity established between the West node and the East node. In this embodiment, these determination steps 255, 260, 265 include storing or preserving the determined values for East-node calculations. They also include updating the determinations, either from time to time or continually (not separately shown), depending on the implementation, and may be updated in any order and without respect to whether the other values are being updated at that time. In a preferred embodiment, each of the values are updated at least whenever an indication that the value has changed has been received (also not shown).

In the Embodiment of FIG. 11, a variable, which is herein referred to as Connected, is then assigned a value for the East node (step 270) based at least in part on the SF and SF-P status at the East node as determined in steps 255, 260, 265. The Down MEPs of the East node can then configured (step 275) to either send CCMs or not send CCMs based at least in part on the value of Connected for the East node. Note that while it not a requirement unless recited in a claim or implied from the context, it is preferably that the value of Connected is changed and the configuration of the third port adapted as soon as a change in network status is indicated.

The method 250 then continues as the East node continues to monitor conditions within the network and adapt accordingly.

Note that the sequences of operation illustrated in FIGS. 10 and 11 represent exemplary embodiments; some variation is possible within the spirit of the invention. For example, additional operations may be added to those shown in FIGS. 10 and 11, and in some implementations one or more of the illustrated operations may be omitted. In addition, the operations of the method may be performed in any logically-consistent order unless a definite sequence recited in a particular embodiment or apparent from the context. In some embodiments, the methods 200 and 250 are both performed in the SNC at or nearly at the same time.

Note also that in the various embodiments above, the method and configured apparatus are described in terms of a protected VID or VIDs. The same apparatus may in some cases be configured to handle other VIDs in another manner. As one example, an intermediate node and an East node may operate in that role for one VID but in different roles for another VID.

Note that in some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors. The executable instructions may also, if and only if explicitly recited in a particular claimed embodiment, be embodied in a propagating signal or similar medium.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. Apparatus for facilitating network protection, comprising:
   an intermediate node, comprising:
      a first port for connecting the intermediate node with a West node of a network;
      a second port for connecting the intermediate node with an East node of a network; and
      a third port for connecting the intermediate node to an external network and for configuring an Up MEP (maintenance end point) for the network;
   wherein the intermediate node is configured to adapt to network conditions based at least in part on the status of connectivity through the intermediate node third port and the status of respective connections to the intermediate node first and second ports;
   wherein adapting the intermediate node to network conditions comprises configuring the third port to filter or not filter selected VID (VLAN (virtual local area network) identifier) traffic according to the value of a variable Connected on the intermediate node calculated as a logical AND between the intermediate-node third port status and the result of a logical AND between the status of the respective connections to the intermediate node first and second ports; and
   wherein the network is an Ethernet SNC (subnetwork connection).

2. The apparatus of claim 1, wherein the Up MEP is configured to receive but not transmit CCMs (continuity check messages).

3. Apparatus for facilitating network protection comprising:
   an intermediate node, comprising:
      a first port for connecting the intermediate node with a West node of a network;
      a second port for connecting the intermediate node with an East node of a network; and
      a third port for connecting the intermediate node to an external network and for configuring an Up MEP (maintenance end point) for the network; and
   an East node, comprising:
      a first port for connecting the East node with the intermediate node and for configuring a Down MEP for the network;

a second port for connecting the East node with the West node and for configuring a Down MEP for the network; and a third port for connecting the East node to an external network;

wherein the intermediate node is configured to adapt to network conditions based at least in part on the status of connectivity through the intermediate node third port and the status of respective connections to the intermediate node first and second ports;

wherein the East node is configured to adapt to network conditions based at least in part on the status of the East node third port and the status of respective connections to the East node first and second ports; and wherein the network is an Ethernet SNC (subnetwork connection).

4. The apparatus of claim 3, further comprising a first connector for connecting the East-node first port to the intermediate-node second port.

5. The apparatus of claim 4, wherein the first connector comprises a direct connection.

6. The apparatus of claim 5, wherein the first connector comprises a fiber optic cable.

7. The apparatus of claim 3, wherein configuring the East node to adapt to network conditions comprises controlling whether CCMs are transmitted from the Down MEPs associated respectively with the East-node first port and the East-node second port.

8. The apparatus of claim 3, wherein configuring the East node to adapt to network conditions comprises issuing or not issuing a Lockout protection command.

9. The apparatus of claim 3, wherein configuring the East node to adapt to network conditions comprises configuring the East node according to the value of a variable Connected on the East node.

10. The apparatus of claim 9, wherein the value of Connected on the East node is calculated as a logical AND between the East-node third port status and the result of a logical NAND between the status of the respective connections to the intermediate node first and second ports.

11. The apparatus of claim 3, wherein the East node comprises an Ethernet connection function hosting an SNC protection switching process.

12. The apparatus of claim 3, further comprising:
a West node, comprising:
a first port for connecting the West node with the intermediate node and for configuring a Down MEP for the network;
a second port for connecting the West node with the East node and for configuring a Down MEP for the network;
a third port for connecting the West node to an external network; and
an Ethernet connection function hosting an SNC protection switching process.

* * * * *